UNITED STATES PATENT OFFICE.

THEOPHILUS D. FARRALL, OF NEW YORK, N. Y.

MANUFACTURE OF ORNAMENTAL GLASS AND GLASSWARE.

SPECIFICATION forming part of Letters Patent No. 262,388, dated August 8, 1882.

Application filed April 6, 1882. (No specimens.) Patented in England July 4, 1881, No. 2,913.

*To all whom it may concern:*

Be it known that I, THEOPHILUS D. FARRALL, formerly of London, England, but now of the city, county, and State of New York, have invented certain new, useful, and important Improvements in the Manufacture of Ornamental Glass and Glassware, described in this specification.

The invention consists in the production of new and special ornamental effects in glass and in various kinds of glassware by peculiar processes of manufacturing the same.

The processes consist in applying to the semi or partially fused surface of a mass or body of glass from or of which the article to be made is to be produced mixtures of crystals of metallic nitrates or chlorides or metallic nitrates and chlorides, then subjecting the mass of glass with the said crystals adhering thereto to the action of coal or illuminating gas, and afterward blowing, molding, or otherwise forming the said mass of glass and crystals to the desired form, the crystals of the metallic nitrates to be used with or without the crystals of metallic chlorides, and strontianite to be used with said nitrates or chlorides or nitrates and chlorides, if desired.

To carry my invention into effect I take a piece of glass metal from the melting-pot on the end of a glass-maker's ordinary blowing-iron and fashion or shape it roughly into the form technically called a "ball." I then roll this ball in a mixture of the crystals of a metallic nitrate or chloride or a metallic nitrate and chloride—such as, for example, nitrate and chloride of silver; or I sift with a very fine sieve or other suitable article the metallic nitrate and chloride upon the rough form of the glass object while in a state of semi or partial fusion. Thus applied, the crystals attach themselves to the semi-fused mass of glass, which, with the crystals adhering to it, is then subjected to the action of coal or illuminating gas. In some cases, before subjecting it to coal or illuminating gas, the mass of semi-fused glass, with the aforesaid crystals adhering to it, may be crackled by immersion in water, and then be reheated, as is the practice in making crackled glass, and subjected to the action of the carbonic-acid gas. After being subjected to the action of coal or illuminating gas the ball or mass of partly-formed glass and crystals of metallic nitrate or chloride or metallic nitrate and chloride are reheated and blown or molded or otherwise formed in the usual or any suitable way into the object it is desired to produce; or the article of glass may be formed into the desired shape with the metallic nitrate or chloride or the metallic nitrate and chloride attached, and then be reheated and subjected to the action of coal or illuminating gas, and immediately afterward be placed in an annealing-kiln. In some cases, after the finished article or articles have been placed in the annealing-kiln, I submit them to the fumes of strontianite, (carbonate of strontia,) and thereby produce a further peculiar and pleasing decorative effect. The color of the ornamentation thus produced is dependent upon the metal the nitrates or chlorides or the nitrates and chlorides of which are employed. The nitrates or chlorides or nitrates and chlorides are mixed in proportions dependent upon the depth of color required, a preponderance of nitrates weakening or lightening the color.

Various shades, gradations, or varieties of color may be produced in the same article by employing the appropriate metallic nitrates and chlorides, or mixtures thereof, and a further decorative effect be produced by the combined action of the strontianite with the metallic nitrates or chlorides or metallic nitrates and chlorides and by the application of coal or illuminating gas and otherwise, as aforesaid.

I claim as my invention—

1. The process of treating glass for decorative, ornamental, and other purposes by applying to the glass while in a heated state the crystals of metallic nitrates or chlorides or of metallic nitrates and chlorides, substantially as described.

2. The process of ornamenting glass or glassware by applying to the glass while in a heated state the crystals of metallic nitrates or chlorides or of metallic nitrates and chlorides, and afterward subjecting the mass to the action of coal or illuminating gas, substantially as described.

3. The process of ornamenting glass or glassware by applying to the glass while in a heated state the crystals of metallic nitrates or chlorides or of metallic nitrates and chlorides, and afterward subjecting the mass to the action of coal or illuminating gas, and the subsequent exposure of the mass to the fumes of strontianite, substantially as described.

4. Glass or glassware ornamented or decorated by the crystals of metallic nitrates or chlorides or metallic nitrates and chlorides fixed by heat with or without exposure to the action of coal or illuminating gas and with or without a subsequent exposure to the fumes of strontianite, substantially as described.

THEOPHILUS D. FARRALL.

Witnesses:
EMERY B. CHADWICK,
F. M. JOHNSON.